United States Patent [19]

McCreery

[11] 4,104,046
[45] Aug. 1, 1978

[54] TEMPERATURE CONTROL FOR THE FORMING UNITS OF A MACHINE OF THE PRESS AND BLOW TYPE

[75] Inventor: Cecil Wayne McCreery, Columbus, Ohio

[73] Assignee: Glass Industry Consultants, Inc., Columbus, Ohio

[21] Appl. No.: 807,169

[22] Filed: Jun. 16, 1977

[51] Int. Cl.² .................. C03B 9/40; C03B 11/12
[52] U.S. Cl. ................................ 65/161; 65/29; 65/162; 65/DIG. 13; 65/356
[58] Field of Search ............... 65/161, 162, DIG. 13, 65/356, 29, 158

[56] References Cited

U.S. PATENT DOCUMENTS

| | | | |
|---|---|---|---|
| 3,148,969 | 9/1964 | Mathias | 65/356 |
| 3,285,728 | 11/1966 | Torok | 65/362 X |
| 3,332,765 | 7/1967 | Champlin | 65/162 |
| 3,630,707 | 12/1971 | Ayers | 65/162 |
| 3,888,647 | 6/1975 | Breeden et al. | 65/162 X |

Primary Examiner—Arthur D. Kellogg
Attorney, Agent, or Firm—William V. Miller

[57] ABSTRACT

An automatic temperature control system for the forming units of a machine of the press and blow type. It comprises a system for automatically sensing the need for and supplying cooling air to the individual forming units, in accordance with heat transfer therefrom, so that controlled temperatures can be maintained in the various units to thereby form ware of uniform characteristics in the various units.

28 Claims, 16 Drawing Figures

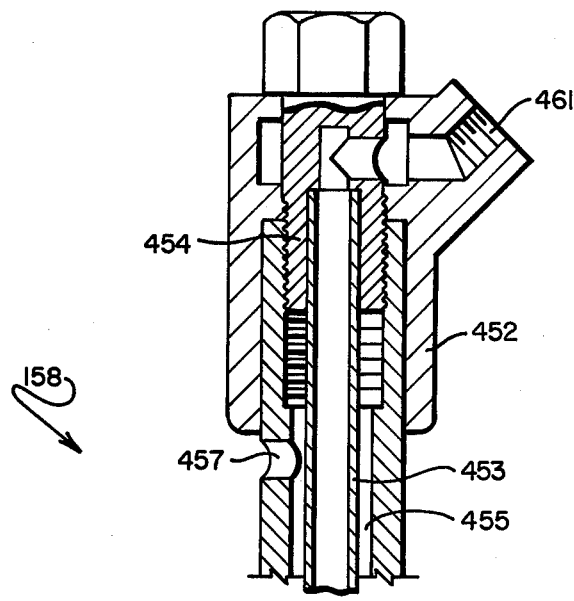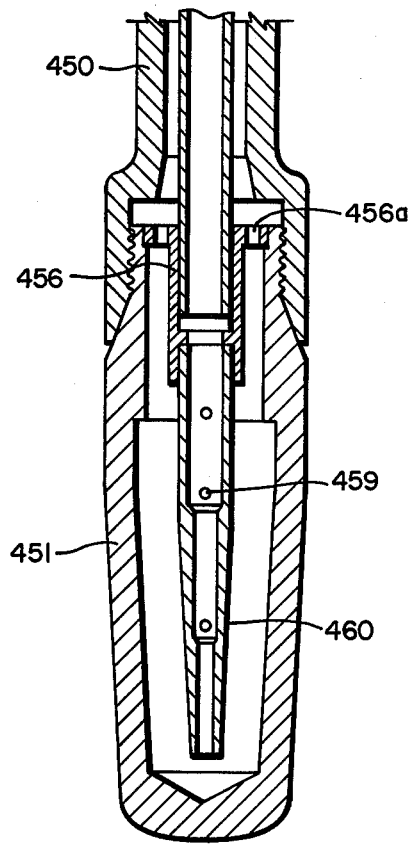
FIG. 14

TEMPERATURE CONTROL FOR THE FORMING UNITS OF A MACHINE OF THE PRESS AND BLOW TYPE

BACKGROUND OF THE INVENTION

This invention relates to a temperature control system for use, for example, on a glass forming machine of the press and blow type in which a parison is first pressed in a blank mold by a pressing plunger and then the parison is subsequently blown to its final shape in a blow mold. This type of machine is illustrated specifically in the patent to Rowe # 1,979,211. A machine commonly in use in the glass industry, at the present time, which substantially embodies the structure disclosed in this patent is known as the "Hartford-28 Machine". In this patented and prior art machine, temperature control is attempted by supplying cooling air or wind into or on various forming units, such as the blank mold and cooperating forming plunger, under the control of manually set valves. Thus, the skill and attention of an operator is relied upon to observe the temperature and condition of the formed ware and to set the valves to bring about the desired heat transfer and temperature conditions. The manual adjustments for the individual units are usually not precise and of a known value and the resulting temperature conditions of the various forming units are not so controlled that the ware produced on the machine by the various units is uniform in quality.

SUMMARY OF THE INVENTION

According to this invention, there is provided an automatic temperature control system which is applied, for example, to a glass forming machine of the press and blow type which automatically senses the heat transfer condition of the parison-forming or blank-forming units thereof and automatically controls the supply of cooling fluid, specifically air, thereto to maintain properly controlled temperatures in the various units so that the final formed ware will be of uniform quality. More specifically, means is provided for supplying cooling air to the blank mold and plunger of each forming unit and this supply of air is automatically controlled in accordance with heat transfer from these members. This control is accomplished automatically by temperature-sensing instruments located at precisely selected positions along the paths of movement on the machine of the blank mold and plunger of each forming unit, which produce a signal from each member that operates a controller which, in turn, operates a loading regulator in the cooling air supplyline for that particular member. Thus, it will not be necessary to rely on the judgement of a machine operator to produce symetrically balanced temperature conditions but properly controlled temperature conditions can be automatically maintained during operation of the machine in order to produce uniform ware.

BRIEF DESCRIPTION OF THE DRAWINGS

The best mode contemplated in carrying out this invention is illustrated in the accompanying drawings in which:

FIG. 14 is a vertical sectional view of a pressing plunger equipped with a cooling air supply arrangement according to this invention;

DETAILED DESCRIPTION OF THE INVENTION

Figure 1:
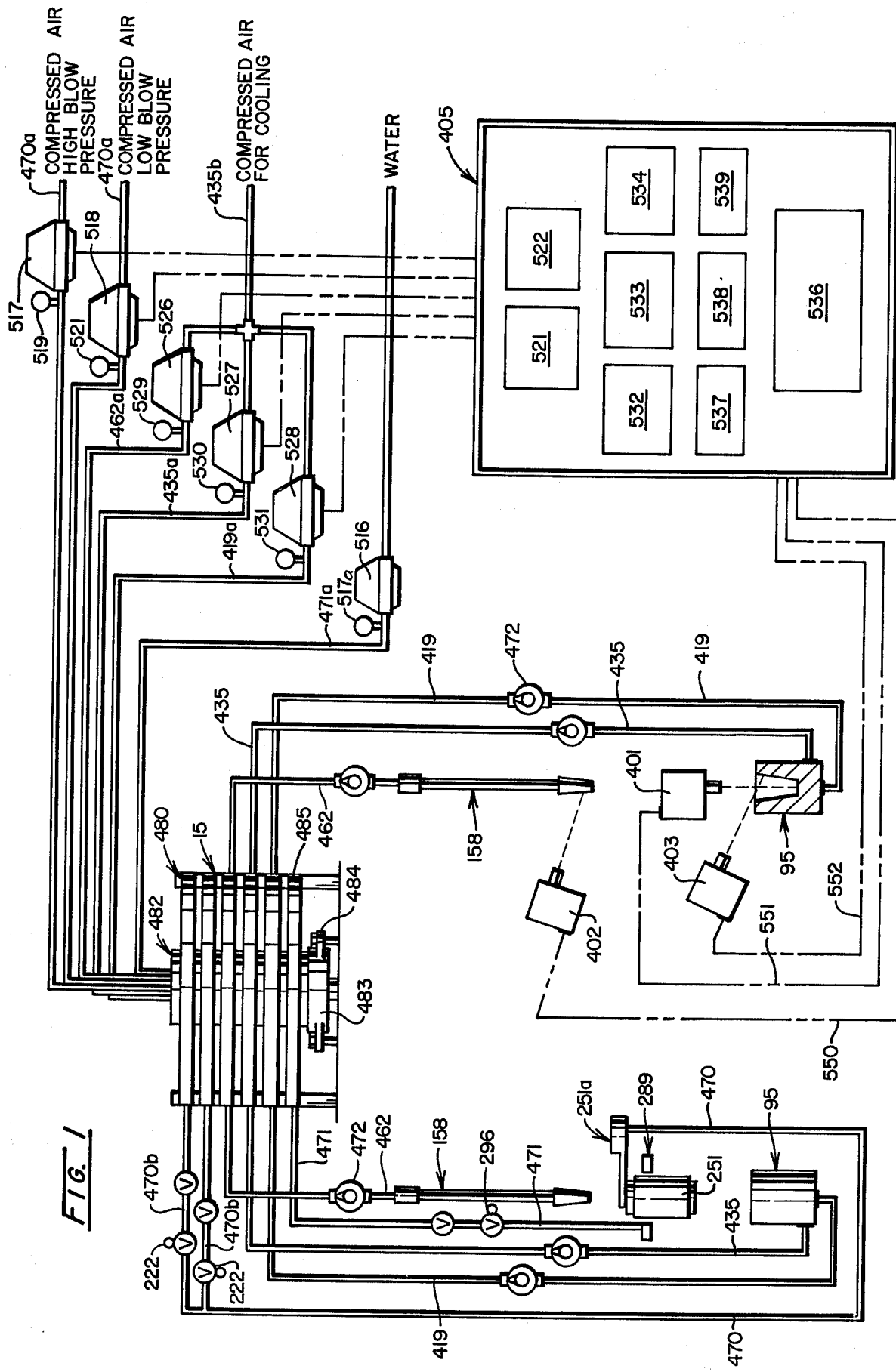
FIG. 1 is a schematic illustration of the temperature control system of this invention applied to a machine of the press and blow type.

As previously indicated, this invention may be applied to a multi-unit continuous press-and-blow glass-forming machine of the type indicated in U.S. Pat. # 1,979,211, although it is not limited in its application to that specific type of machine. All of the details of the machine of this example are substantially disclosed in the patent and reference will be made herein only to those parts of the patented machine which are necessary to an understanding of the present invention.

The machine of the patent forms hollow glassware by a pressing operation and a subsequent blowing operation. A press or blank mold is suitably supplied with a charge of molten glass and a pressing plunger cooperates therewith to form a blank or parison. At the same time, a sectional neck ring is disposed in cooperation with the blank mold to produce a neck or lip of the article to be made. The plunger and blank mold are stripped from the formed blank while it is still suspended by the neck ring. Next, a blow mold, usually a paste mold, is brought into enclosing relationship to the neck-ring-suspended blank and the blank is blown into the shape of the final article. The blow mold is thereafter removed from about the blank and, finally, the neck ring is opened to release the finished article therefrom.

The present invention provides an automatic temperature control system to provide the proper amount of cooling fluid to each blank mold and cooperating plunger of the forming units of a multiple-unit press and blow machine of the type disclosed in said patent. This is accomplished by temperature-sensing instruments located around the machine to sense the temperature of the plunger and the blank mold independently at some time, during the period of operation of the machine, when the plunger is out of the blank mold and the blank mold is empty of glass or blank.

Similar reference characters are used to identify units which are similar to those shown in the patent.

Figure 4:
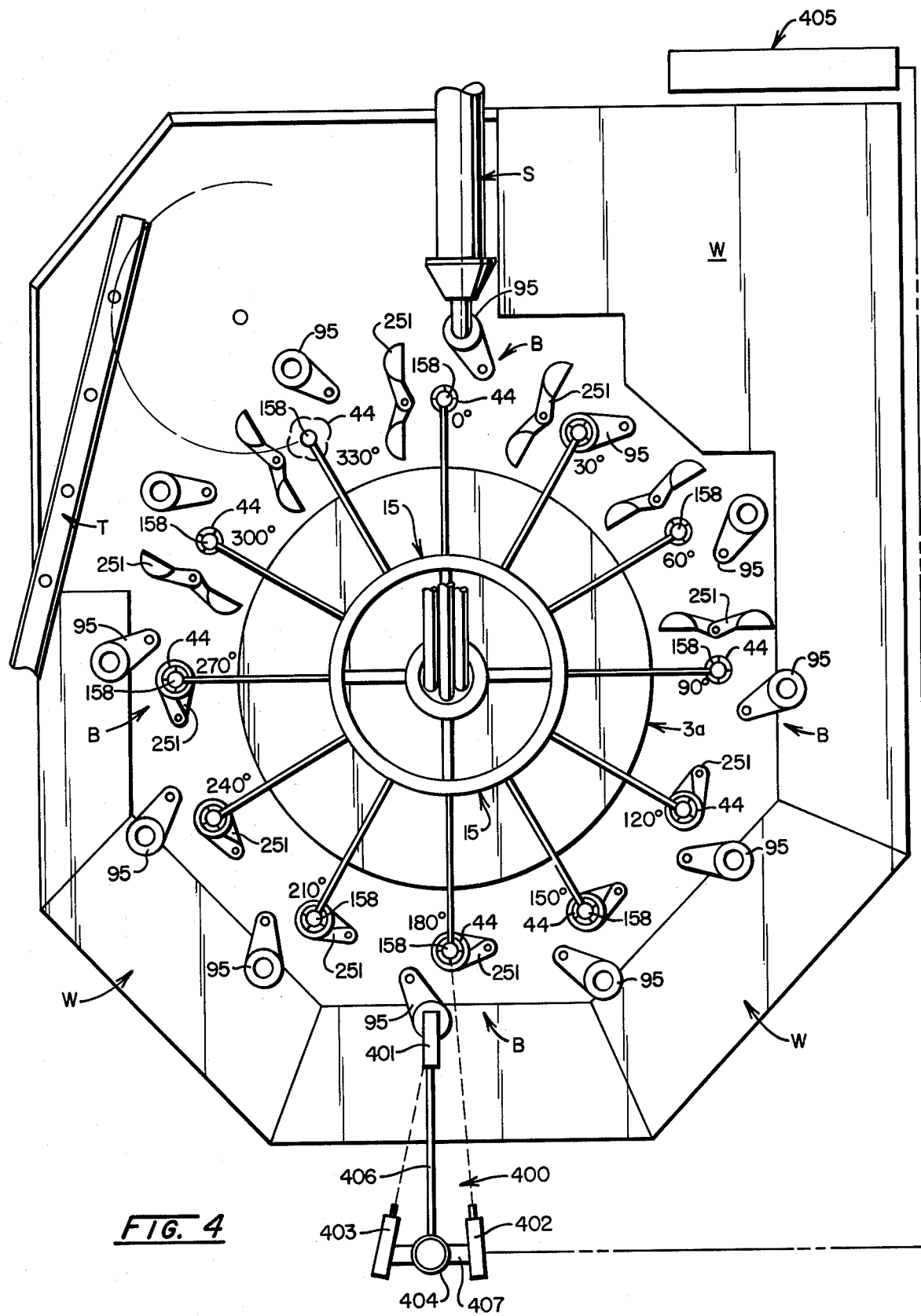
FIG. 4 is a diagramatic plan view of the machine with the temperature control system located in cooperation therewith.
Figure 5:
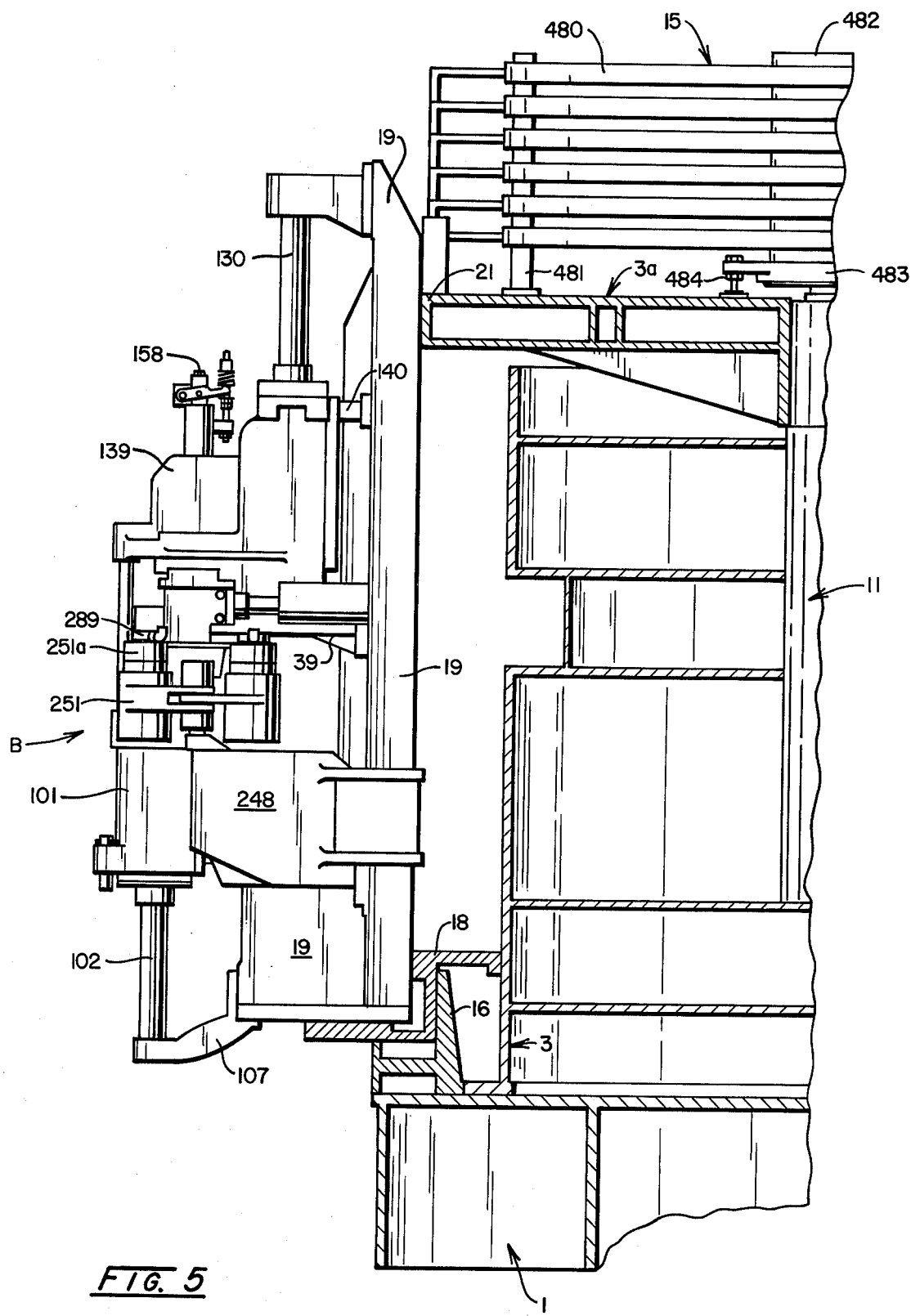
FIG. 5 is a schematic view of the machine of the patent showing one of the forming units thereof and the temperature control system of this invention applied thereto.
Figure 6:
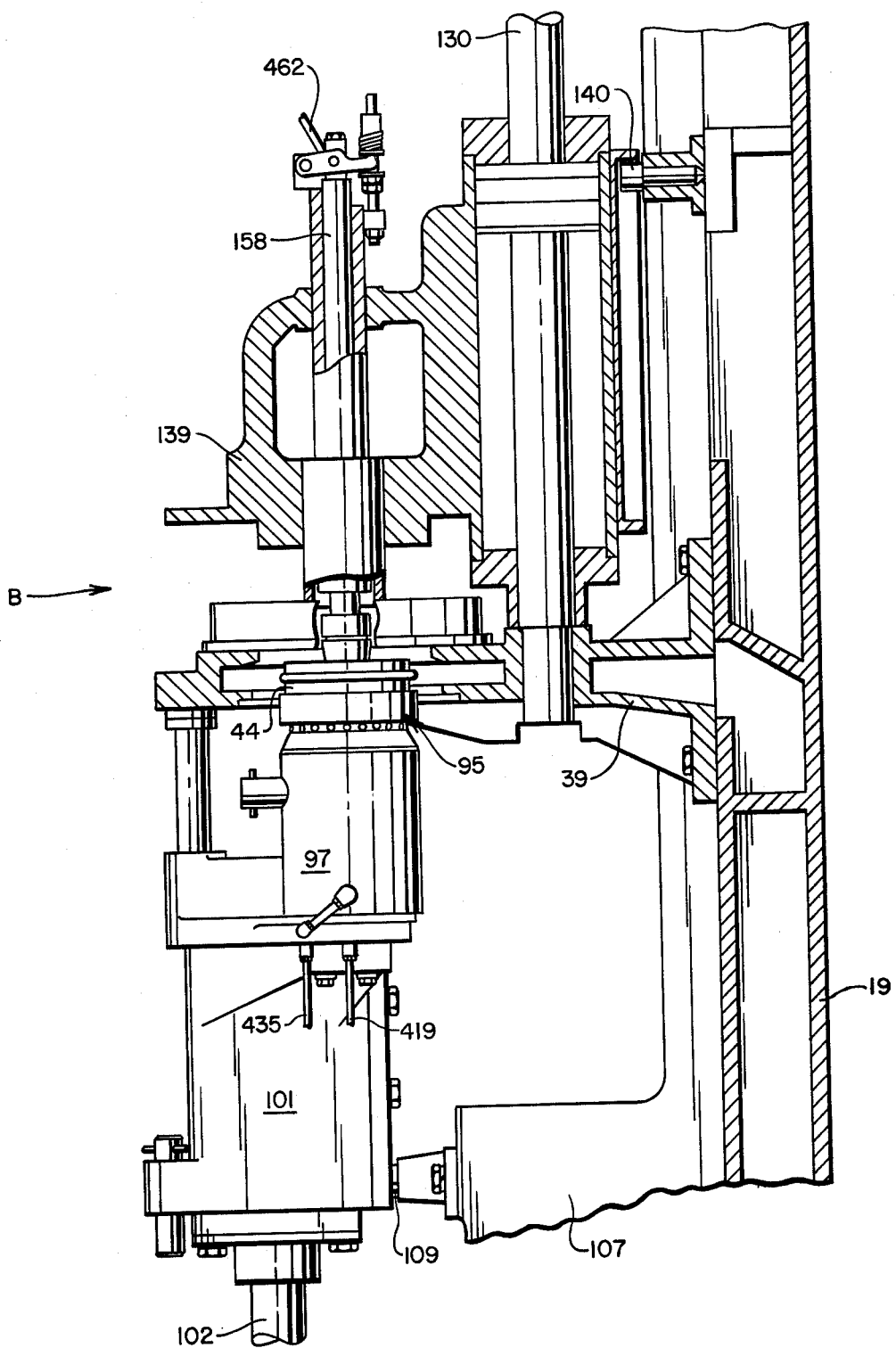
FIG. 6 is a schematic view of the cooperating forming plunger and blank mold of one pressing portion of the machine with their cooling means applied thereto.

More specifically, in the example given, the patent machine as substantially illustrated best in FIGS. 4, 5 and 6, is of the turret type and includes a cylindrical base 1. On this base 1, is a fixed housing 3 which carries a centrally-located upstanding stationary standard 11. A fluid distribution assembly 15, different from that in the patent and constructed in accordance with this invention, is mounted above the upper end of the standard 11. Around the housing 3, is a fixed lower bearing ring 16 and, on this ring, is rotatably mounted a lower turret ring 18. On this turret ring, at angularly spaced intervals, are mounted a plurality of identical forming units, these units being carried by sub-frame members 19 secured to the lower turret ring 18. An upper turret ring 21 is rotatably mounted on the upper end of the standard 11 and is connected to the various sub-frames 19. Thus, the two rings 18 and 21 are connected together by vertical sub-frame members 19 to provide a rotatable turret 3a with its center of rotation at the axis of standard 11. Within this turret is the fixed housing 3 and other housings carried thereby. Actuation and timing of the various units are cam-controlled as indicated in the patent.

As previously indicated, each forming unit B includes a blank mold, which is indicated generally at 95, a pressing plunger, which is indicated generally at 158, a neck ring which is indicated generally at 44, and a blow mold indicated generally at 251. The pressing part of the forming unit with which the present invention deals, and consisting of blank mold 95 and the pressing plunger 158, with the cooperating sectional neck ring 44, provide a blank pressing unit. The sectional blow mold 251 is usually of the paste type, a sectional blowhead 251a cooperates with the blow mold 251, and spray heads 289, which spray water into the paste blow mold, are also provided. These latter three parts are merely shown diagramatically in FIGS. 1 and 5, as the temperature sensing and cooling means of this invention is not applied to them.

The machine illustrated herein is shown as having twelve forming units (FIG. 4) but it is to be understood that this number may vary and will not affect the present invention.

Each of the blank molds 95 of the various pressing units is of one piece usually and as described in said patent is mounted on a holder 97 carried by an arm 100 (FIG. 7) integral with a cylinder 101 which is slidable on a vertical standard 102 to provide vertical movement for the blank mold. Standard 102 is carried by a bracket 107 which, extends from sub-frame member 19. Lateral movement of the blank mold is provided in response to its vertical movement by cam means 109 which swings cylinder 101 about standard 102.

As described in detail in said patent, each blank mold 95 is thus moved with a combined horizontal and vertical movement from an inner radius position to an outer radius position with respect to the entire machine. The horizontal components of the blank mold inward and outward movement are illustrated in FIG. 4 in relation to the path of the neck ring 44 and cooperating plunger 158, each of which is a true circle about the center of the machine.

As disclosed in detail in the patent, each of the neck rings 44 is supported by means of a shelf or extension 39 which is secured to the sub-frame 19 and extends radially outwardly therefrom. Each neck ring is formed of several sections which are pivoted for opening and closing movement on the shelf 39. The neck ring sections are closed and opened and the ring assemblies are rotated or remain stationary at timed intervals during rotation of the turret 3a as described in said patent.

Each of the plungers 158 is supported independently for vertical reciprocal movement in timed relationship to the rotation of the turret as described in said patent. During the pressing operation, each respective plunger will be aligned with a blank mold 95 and a closed sectional neck ring 44 as shown in FIG. 6. The plunger 158 is carried for vertical reciprication relative to the blank mold 95 and cooperating neck-ring 44 by a casting 139 which is mounted for vertical sliding movement on a standard 130 that is carried by the extension 39 of the sub-frame 19. This vertical movement, as described in said patent, is controlled by cam means 140.

A blow mold 251, as previously indicated, receives the blank after it is formed by pressing with the plunger 158 in the blank mold 95. The blow mold is usually made of two pivoted halves which are carried by a housing 248 that is suitably supported by the sub-frame 19. Spray heads 289 are usually provided for spraying the interiors of the blow mold halves when open and are carried by the member 139 which supports the plunger 158. The means for supplying blowing pressure to the blow mold 251 is different in the machine shown herein as compared to the patent and includes a split blowhead 251a which at the proper time moves over the blow mold 251. It is illustrated schematically and is carried by the member 139. However, as indicated, the temperature control of the blow mold and associated parts is not part of the present invention.

FIG. 4 shows schematically the blank molds 95, the neck rings 44 and the plungers 158 of the various pressing units, along with the blow molds 251, and their movements during the continuous rotation of the turret 3a. The blank molds 95 are movable in a non-circular path, as indicated, but will also have vertical movement so that each one-piece blank mold can be stripped downwardly from the neck-ring suspended parison. The sectional neck rings 44 will move in a true circle in a fixed horizontal plane and will open and close at the proper time during the continuous rotation of the turret. The plungers 158 will move in a circle, during the continuous rotation of the turret, which corresponds to the circle of movement of the neck rings but will also be moved vertically in timed relationship to the opening and closing thereof and the movements of the blank molds to perform the pressing operation. Blow molds 251 will have the necessary vertical movement and opening and closing of their sections as they move in a circular path as described in said patent.

In FIG. 4, a walkway W is shown partially around the machine. The degrees of rotation of the turret 3a are indicated and it will be understood that the rotation is continuous in a clockwise direction. A spout S supplies a predetermined charge or gob of glass to the blank mold 95 which will be in a position outwardly of the associated plunger 158 of this forming unit B, the plunger being in the 0° position of the turret rotation. At this time, the neck ring sections will be closed and the plunger will be raised. The blow mold will also be open at this time. As the turret continues to rotate, the blank mold 95 will move beneath its cooperating plunger 158 and the neck ring 44 being closed, will accept the blank mold in closing position at about 30°. The plunger will then be moved downwardly into the neck and blank mold and press the parison or blank P from the previously supplied charge, this occurring between about 30° and 60° in the turret rotation. At about 60° in the turret rotation, the blank mold will lower and swing out of alignment with the plunger, leaving the parison suspended by the still-closed sectional neck ring. At about the 120° position, the blow mold sections will swing around the neck-ring suspended parison or blank P and the plunger will be withdrawn vertically. From the 120° position to almost the 300° position, the blowing of the parison in the blow mold 251 will occur and, finally, in about the 330° position, the neck ring will open and will release the blown article to a takeout mechanism which will move it onto a takeout conveyor T. However, it is to be understood that adjustments may be made in these angular positions.

According to this invention, a temperature sensing means will sense the temperature of each blank mold 95 and associated plunger 158, at some angular position around the turret 3a, and will control the supply of cooling air thereto, so that all of the pressing portions of the forming units B will operate at a controlled temperature and thereby produce blanks of a controlled temperature, for example about 800° F to 1100° F, which are subsequently blown to produce uniform quality ware. This sensing may occur at any position around the machine where the blank mold 95 is free of glass and the plunger 158 is out of the mold.

In FIG. 4, the temperature sensing unit is indicated generally by the numeral 400 and is shown located at about the 180° position. It is mounted completely independently of the machine so that it will not be affected by the vibration of the machine. In this example, it is shown as including three temperature sensing instruments 401, 402 and 403 which are carried by a pedestal or standard 404 supported outwardly of the walkway W. The instrument 401 is carried by a long inwardly-extending arm 406, and the instruments 404 and 403 by the laterally-extending arms 407. These instruments are connected to recording and indicating instruments on an instrument panel 405 which is also supported independently of the machine so as not to be affected by vibrations therein. These instruments will be discussed later.

Figure 7:
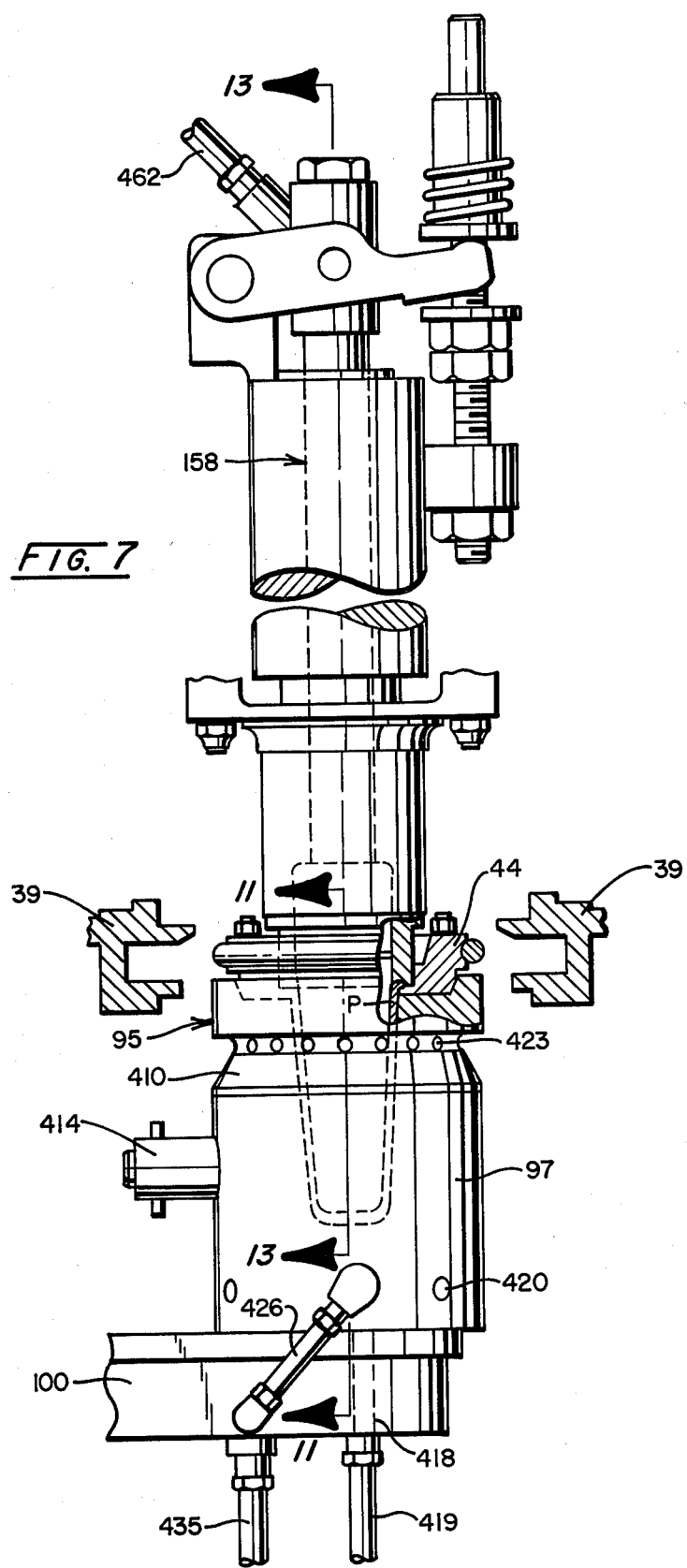
FIG. 7 is a side elevational view of the cooperating pressing plunger and blank mold and showing the connections for supplying cooling air thereto.
Figure 11:
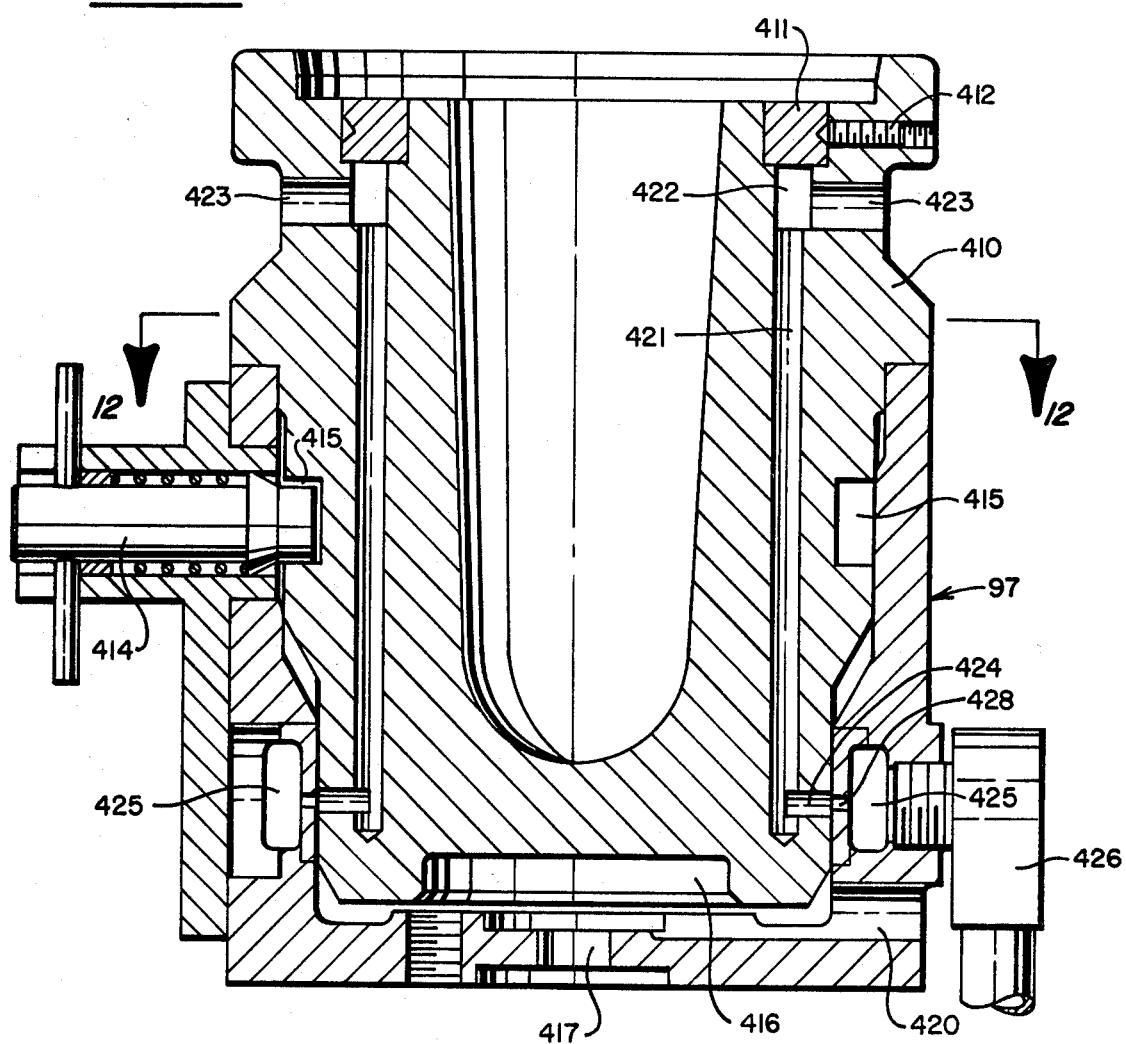
FIG. 11 is a vertical sectional view, taken along line 11—11 of FIG. 7, showing one type of blank mold and holder with cooperating cooling air supply arrangement according to this invention.
Figure 12:
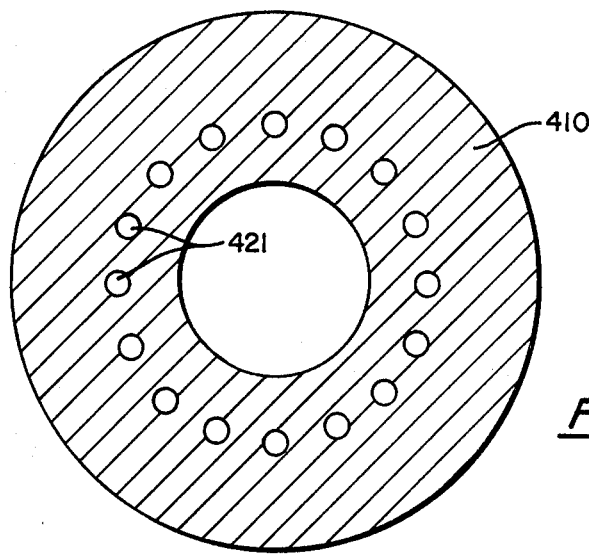
FIG. 12 is a sectional view taken on Line 12—12 of FIG. 11.

Each of the blank molds 95 and its holder 97, according to this invention, is provided with passageways for circulating cooling fluid through the walls thereof completely around the periphery of the mold and for its complete height, for example air, and one of these arrangements is shown best in FIGS. 7, 11 and 12. In this example, the blank mold holder is indicated at 97 and this holder receives a blank mold cavity member 410. The mold member 410 is held in the holder 97, after it is inserted therein, by means of a spring-activated lock pin 414, extended radially inwardly through holder 97 into a groove 415 in the retainer sleeve 410. The mold member 410 at its bottom end is exposed to a chamber 416 for cooling air in the holder 97. This chamber 416 receives cooling air through a central opening 417 in the bottom of the holder which aligns with a vertical passageway 418 (FIG. 7) formed in the support arm 100. This passageway 418 receives cooling air from a flexible air line 419. This cooling air, as will later appear, is supplied continuously and will escape from the chamber 416 through radially-extending outlets 420 at the bottom of the holder 97. Thus, the bottom of the blank mold insert 411 will be effectively cooled.

The sides of the mold cavity member 410 are cooled by a plurality of vertical cooling air passageways 421 which are provided completely around its periphery. These are formed by vertical bores extending the height of the side wall of member 410, as indicated in FIG. 12. The passages 421 adjacent their upper ends communicate with an annular space 422 within member 411. This space has a number of radial outlets 423 leading therefrom. A ring 411 is disposed above the upper ends of bores 422 and closes them, being held in place by a screw 412. The lower ends of passages 421 receive cooling air from radial inlet bores 424, in member 410, that align with inlets 428 formed in holder 97, these inlets receiving air from an annular chamber 425 in the holder. Cooling air is supplied continuously to this space 425 from an air connection 426 and this air will flow upwardly through the passages 421, the space 422 and out the outlets 423, thereby cooling the side walls of the mold cavity member 410. Air connector 426 receives its air supply from a flexible air line 435 (FIG. 7) connected thereto at the support arm 100.

Figure 13:
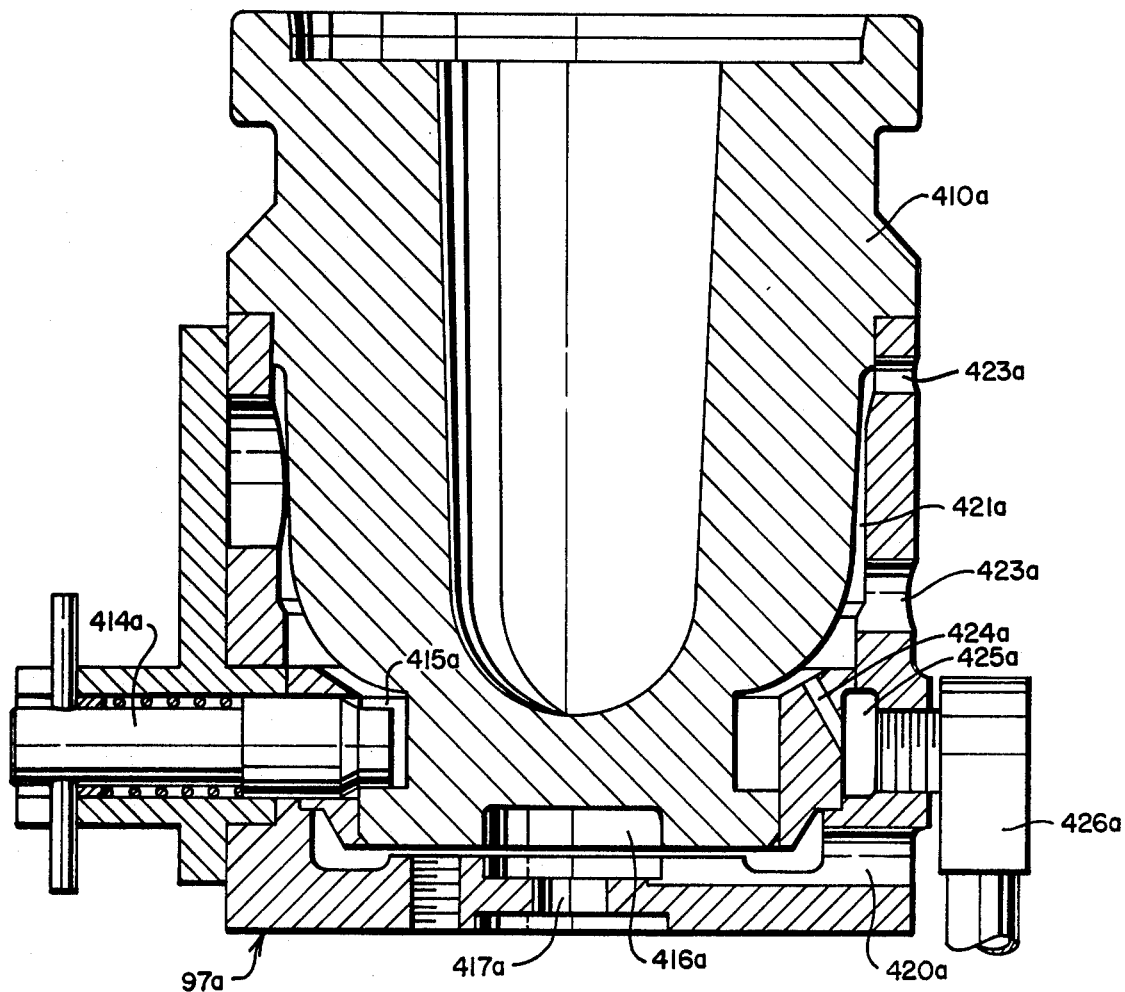
FIG. 13 is a view similar to FIG. 11 showing a different arrangement of blank mold and holder and a different cooling arrangement.

The blank mold and its holder shown in FIG. 13 is somewhat different and are provided with different arrangements of cooling air passages but accomplish the same purpose of cooling the mold vertically and circumferentially. The mold, including the cavity member 410a, is of one piece and fits directly into the holder 97a. It is retained in the holder by lock pin 414a fitting into groove 415a in its side. Around the sides of the member 410a and within the holder 97a, is an air space 421a, which communicates with outlet openings 423a in the side wall of the holder 97a, and which receives the cooling air through inlets 424a leading from an annular passage 425a in the holder, which receives air continuously from the connection 426a. Thus, cooling air for the sides of the mold cavity member 410a will flow from connection 426a, through passage 425a, into chamber 421a between the mold cavity member 411a and holder 97a, and out through the outlets 423a cooling the sides of both members. The bottom of member 410a, and that of associated holder 97a, are cooled substantially as before by means of a space 416a which receives cooling air continuously through inlet 417a, and from which it escapes through the radial outlets 420a.

Each of the plungers 158, according to this invention, is also provided with an arrangement for circulating cooling fluid, for example, air continuously therethrough both vertically and circumferentially and one example of such an arrangement is illustrated in FIG. 14. The plunger comprises a main tubular stem 450 on the lower end of which is mounted the pressing tip 451 which is hollow and of proper complemental shape to cooperate with the blank mold 95 and neck mold 44 to form the blank or parison P. The upper end of tip 451 is threaded to screw upwardly into a socket 450a at the lower end of the stem 450. The upper end of the stem 450 is carried by a fitting 452. Centered within the stem 450 is an air-conducting tube 453 which is held in concentric spaced relationship therewithin by an upper sleeve 454, mounted in the fitting 452, and threaded into the stem 450, and a lower sleeve and collar 456 press-fit within the upper end of the tip. This provides, around the tube 453 in the stem 450, and annular air passage 455 which has radial outlets 457 at its upper end. The lower sleeve and collar 456 has vertical passage 456a extending through its upper flange and leading into the upper air passage 455 from a lower annular air chamber 458, which is formed within the tip 451 around an air nozzle 460. This nozzle is centered in the lower portion of sleeve 454, which extends down into the tip chamber 458, and is provided with a series of radial outlets 459 at different levels. Thus, nozzle 460 and tube 455 are exactly aligned and centered.

The fitting 452 at the upper end of the plunger 158 is provided with a connection 461 by means of which a flexible air line 462 (FIG. 7) may be connected thereto. Air will flow continuously into the fitting, downwardly through the connected tube 453 and outwardly through the outlets 459 into the cooling chamber 458 of the tip 451. From the chamber 458, the air will flow upwardly through the passages 456a, passage 455 and finally to the atmosphere through the upper outlets 457. During this continuous circulation of cooling air, the plunger 158 will be cooled, throughout its periphery and length or vertical extent.

The blow heads 251a, for performing the final blowing operation, are supplied with high-pressure blowing air at the proper time through a flexible line 470 (FIG. 1). Thi line has two branches 470a which are controlled by cam-actuated valves 222 as described in said patent.

The spray heads 289 receive water through a flexible line 471 (FIG. 1) connected thereto. This line may include a cam-actuated valve 296 as described in said patent.

Figure 15:
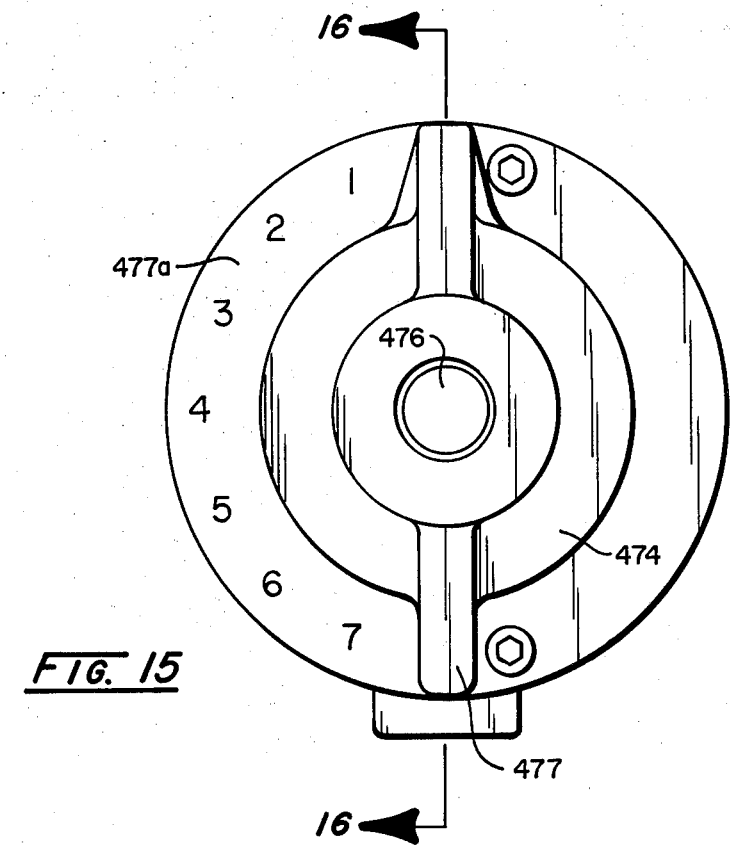
FIG. 15 is a plan view of a calibrated, manually-set air supply valve.
Figure 16:
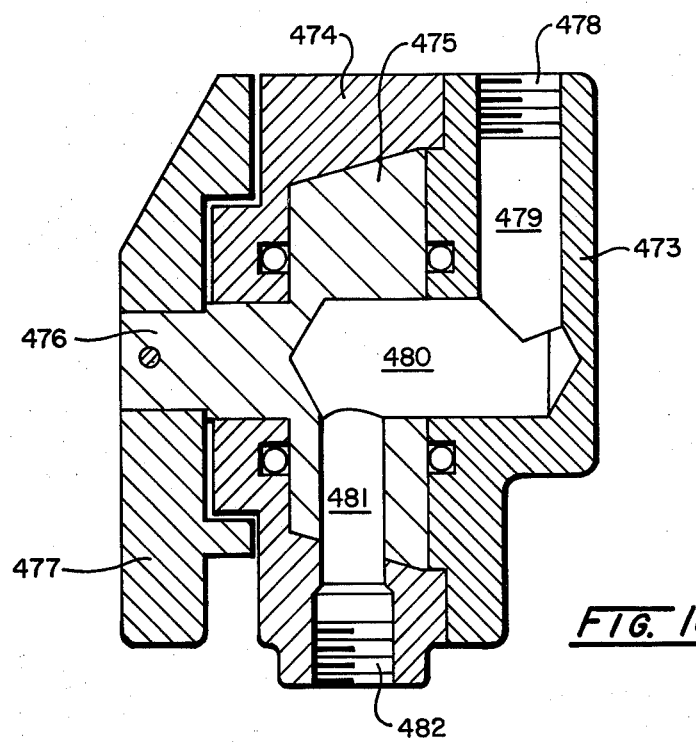
FIG. 16 is a sectional view taken along line 16—16 of FIG. 15.

Each of the air lines 419, 435 and 462 for supplying cooling air to the various parts of the pressing members of the forming units B may be provided with manual valves 472 (FIG. 1) for controlling the air flow in the respective lines manually, although it is not necessary to use these manual valves normally when the machine is equipped with and controlled by the automatic temperature control system to be described. However, if valves 472 are used in the various lines, it is preferred to use a type which can be accurately set to obtain a preselected air flow. An example of a suitable valve is shown in FIGS. 15 and 16. The valve comprises a pair of cup-like housing sections 473 and 474, which enclose a valve member 475, rotatably mounted by a stem 476, projecting through the housing section 474 and carrying a handle 477. This handle cooperates with calibrations 477a on the exterior of member 474 to indicate its set position. A threaded socket 478 is at the outer end of an inlet passage 479 to receive a portion of the air line and this passage communicates with a central passage 480 in the valve member 475. This member 475 has a plurality of outlets 481, of various sizes, leading radially outwardly from the central passage 480 thereof, any of which may be selectively aligned with the threaded outlet 482 that is adapted to receive the other part of the air line. Thus, the amount of air flowing through the valve may be selected by rotating the valve member 475 and will be indicated by calibrations 477a.

The fluid distributing unit assembly 15, as previously indicated, is mounted on top of the machine and is of special construction, according to this invention, to provide the cooling air to the various members of all the pressing members of the forming units B as well as to supply the blow-air to the blow-heads 251a and the water to the spray-heads 251a. For these purposes, the unit 15 is connected to all of the cooling air lines 419, 435, 462, the blowing pressure air lines 470, and the water lines 471, of all the forming units of the machine, as indicated schematically in FIG. 1. However, in this Figure, connections to only two forming units B are indicated but it will be apparent that in the machine, given as an example, there will be twelve such units. Moreover, this number could be increased in other machines to which this present invention could be applied. The assembly 15 will be carried on top of the machine and will consist of an outer stacked manifold section 480, which is supported by the angularly spaced standards 481 (FIGS. 5, 8 and 9) from the upper rotatable turret ring 21 of the turret 3a, for rotation therewith, and an inner stacked distributor section 482, which is enclosed within the manifold and is fixed in a stationary position on the upper end of the fixed standard 11. The ring 21 carries a bearing ring 483, which is fixed to the upper surface of it by angularly spaced bolt units 484, and surrounds the lower end of the distributor section 482, about which it rotates.

Figure 9:
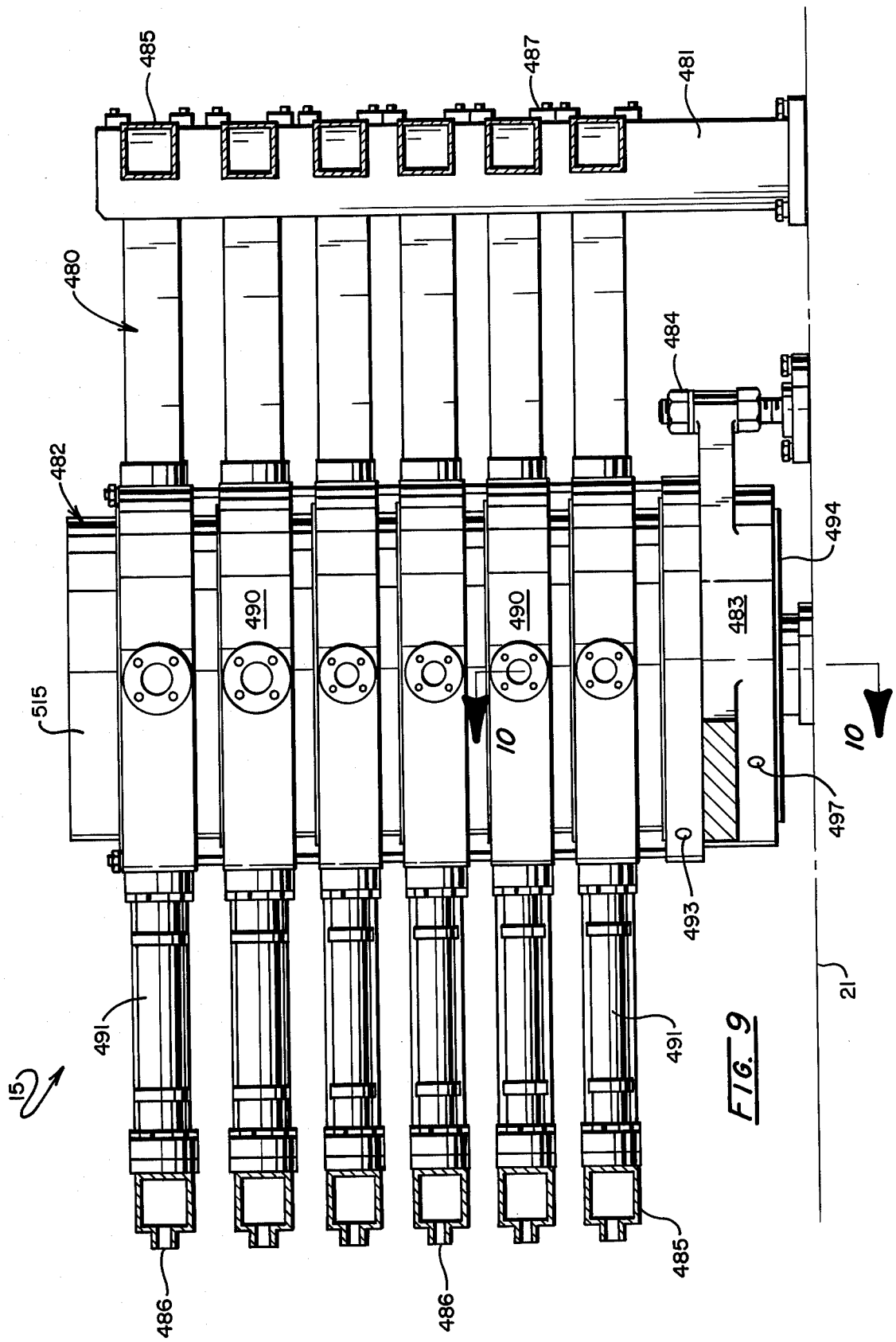
FIG. 9 is an enlarged vertical sectional view, taken on line 9—9 of FIG. 8, showing the fluid distributing manifolds.

The manifold section 480 is shown as consisting of six outer manifold rings 485 in FIGS. 1 and 9 for receiving the connections of the various fluid lines of the various forming units. The lowermost ring receives the connections of the water lines 471, the ring next above receives the connections of the blank mold bottom cooling air lines 419, the ring next above receives the connections of the blank mold side cooling air lines 435, and the ring next above receives the connections of the plunger cooling air lines 462. The two uppermost outer manifold rings receive the connections of the blow mold head air lines 470b.

Figure 8:
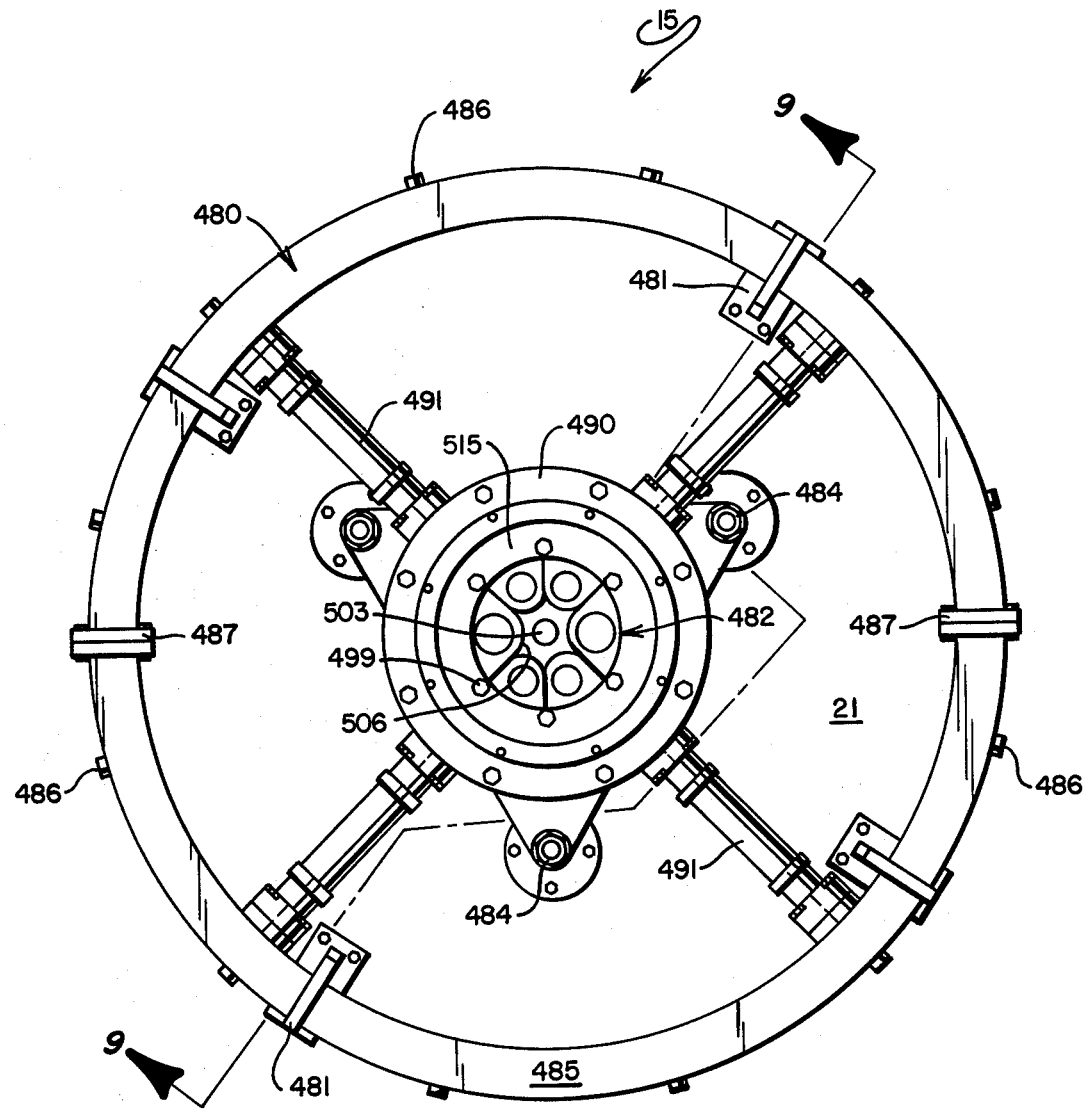
FIG. 8 is a plan view of the fluid distributing assembly for the machine.

Each manifold ring 485 may be of the construction illustrated in FIGS. 8 and 9. It is preferably made of two half-ring sections which are of square tubular cross-section and are bolted and sealed together at the joints by couplings 487. Each ring is provided with the necessary connections 486 for receiving the various fluid lines at angularly spaced positions on the exterior. As indicated in FIG. 9, each standard 481 is notched at different levels to receive the respective manifold rings and they are retained in these notches by the clips 487 which are bolted to the standard.

Each of the outer manifold rings 485 is connected to a centrally disposed inner manifold ring 490. This connection is made by means of four angularly-spaced, radially-extending flexible conduit connections 491 (FIG. 8), the ones for the two upper rings being of larger diameter. The inner manifold rings 490 rotate with the outer manifold rings 485.

Figure 10:
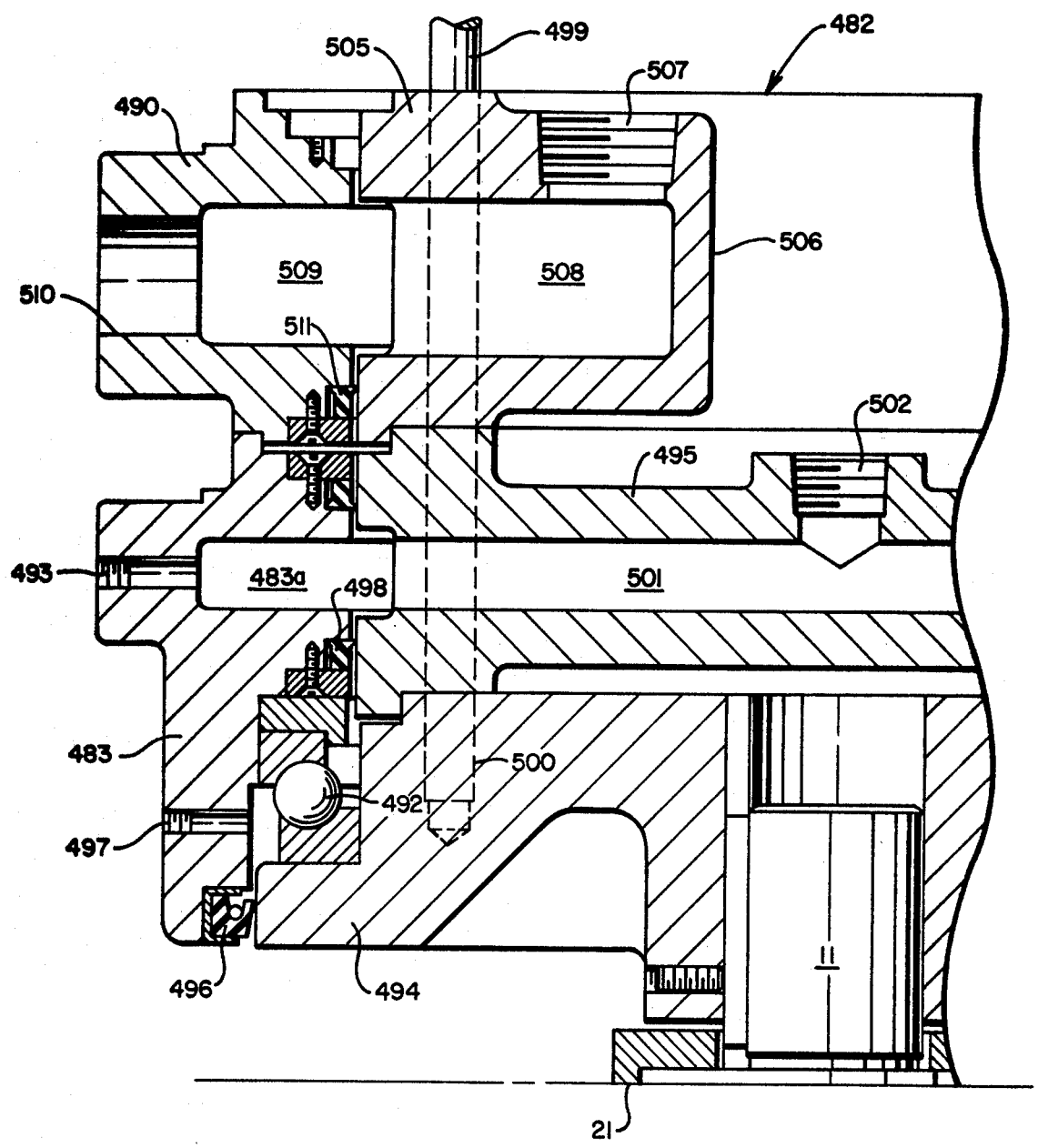
FIG. 10 is an enlarged vertical sectional view, taken on line 10—10 of FIG. 9 showing the bearings and seals associated with the relatively rotatable inner mainfolds and central distributors.

The lower bearing ring 483, as indicated, is fixed to the turret ring 21 for rotation therewith. This bearing ring is rotatably mounted on a fixed disc-like bearing support 494 (FIG. 10) which is keyed to the standard 11 so it will not rotate and which carries the ballbearing 492 for supporting the bearing ring 483. The ring 483 has radially extending outlets 493 for connection to lubricant lines which may lead to various parts of the machine. Within the ring 483, is formed an annular chamber 483a for receiving lubricant supplied by an oil distributor core 495 disposed within the ring 483. Between the bearing ring 483 and bearing support 494 is a lower seal 496 and above this seal is an oil inlet 497 which may be connected to supply outlet 493. A seal 498 is provided between the rotatable ring 483 and the stationary oil distributor 495. This distributor is of annular form and is anchored to the fixed support 494 by means of a vertically-extending bolt 499 which has its lower end threaded into one of six angularly-spaced openings 500 opening upwardly from the member 494. The member 495 is provided with radially-extending oil passageways 501, leading from a central inlet 502 that is adapted to be connected to an oil supply line 503 (FIG. 8) which may enter downwardly through the axis of the assembly 15.

On top of the oil distributor 495 within the lowermost inner manifold ring 490 is a fluid distributor member 505. This member is of substantially annular form so that it will fit within the cooperating ring 490 but is provided with an inwardly extending coupling lug section 506, which has an upwardly opening threaded coupling socket 507 for receiving a fluid supply line. The coupling member 506 has a fluid chamber 508 therein which is aligned with an annular chamber 509, in the ring 490, that is provided with the fittings 510, at angularly spaced positions, for receiving the flexible conduits 491 which connect to the cooperating manifold ring 485. A seal 511 will be carried by ring members 483 and 490 for sealing around both the members 495 and 505, and similar seals will be provided between the other stacked inner manifold rings 490 and enclosed distributors 505, to permit relative rotation without escape of fluid. The lowermost manifold 485 and associated distributor 505 will be for supplying water to the spray heads 289 as previously indicated. Therefore, coupling 507 of member 505 will receive the water supply line 471a (FIG. 1).

Stacked on the distributor 505 are five more practically identical distributors which are enclosed by the cooperating stacked rings 490. These five members 505 and the surrounding rings 490 are practically identical except that the two uppermost may have larger air passages and connections 491 as they are for supplying the high-pressure air for the press heads 251a, whereas the others are for supplying cooling air to the blank molds 95 and plungers 158. So that the fluid line connections may be made to the stationary distributors 505, at the various levels, the radially inwardly extending coupling lugs 506 are angularly offset relatively, as indicated in FIG. 8, and the lines may be freely passed downwardly through the center of the stationary distributor section 482 without interference. Thus, high pressure air supply lines 470a (FIG. 1) may connect to the two upper distributors 505, and the cooling air supply lines 462a, 435a, and 419a to the next three succeeding lower distributors 505, all of these connections being made through the center of the distributor. Also, each of the members 505 will have the six bolt holes 500 which will align with those of the other members so that the clamping bolts 499 can pass downwardly therethrough and mount all such members on the stationary support 491. A cover 515 (FIG. 9) may also be mounted at the top of the section 482 but this will have a central opening to permit vertical passage of the fluid lines (FIG. 8).

Figure 3:
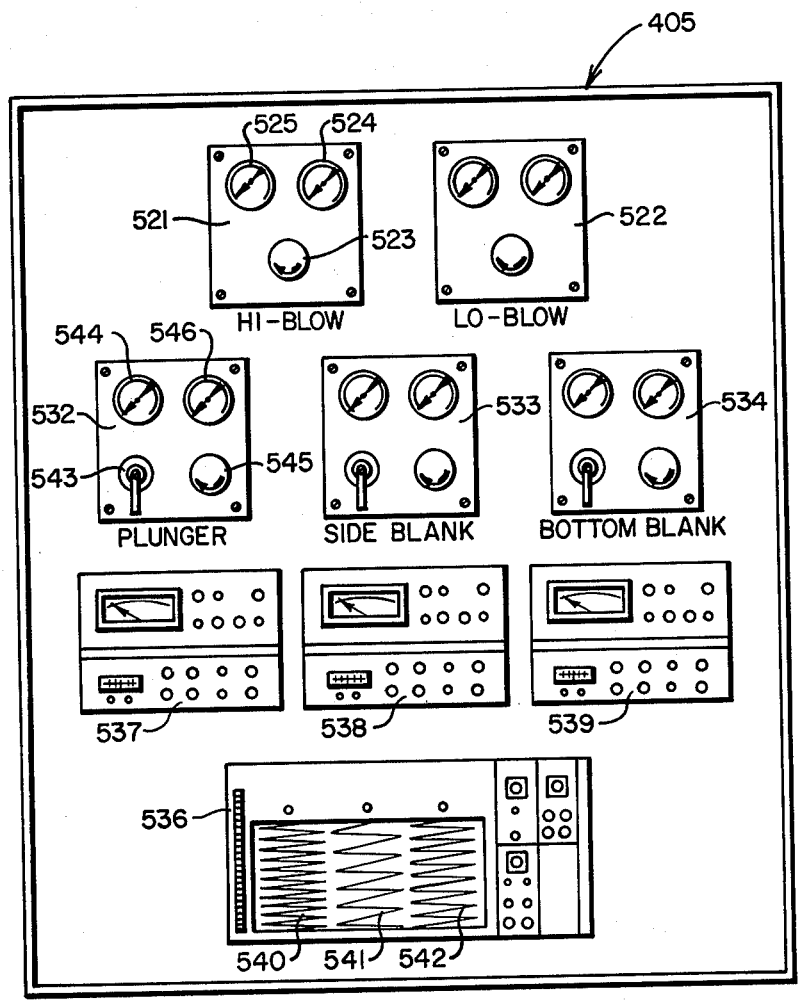
FIG. 3 is a schematic view of the panel of the temperature control system for the machine.

The water line 471a will receive its supply from a suitable source and it will have interposed therein (FIG. 1) a loading regulator 516 which converts the inlet pressure to a selected outlet pressure that will be indicated by a meter 517a. The lines 470a for supplying blowing pressure to the blow heads 251a will receive air continuously from a suitable source and these lines will have the loading regulators 517 and 518 interposed in the respective lines along with associated indicating meters 519 and 521. These regulators are of a common, commercially available type and will regulate the outlet pressure automatically. These regulators are connected in the usual manner to the instruments on the sub-panels 521 and 522 on the main panel 405 (FIG. 1) which is illustrated more clearly in FIG. 3. Each of these panels preferably includes a valve 523 for cutting off the automatic control, a meter 524 for indicating the supply pressure and a meter 525 for indicating the outlet pressure.

The three lines 462a, 435a and 419a, for cooling air for the plungers 158 and blank molds 95, receive their cooling air continuously from a suitable source through a single supply line 435b (FIG. 1). These lines are also provided with the respective loading regulators 526, 527 and 528 and associated meteres 529, 530 and 531. These regulators are connected to the instruments on the sub panels 532, 533 and 534 on the main panel 405. The loading regulators, as indicated, are commonly available and operate to change the incoming pressure to the pressure selected at the instrument panel. Each regulator is connected by a combined fluid and electric circuit to the main panel as indicated in FIG. 2.

Figure 2:
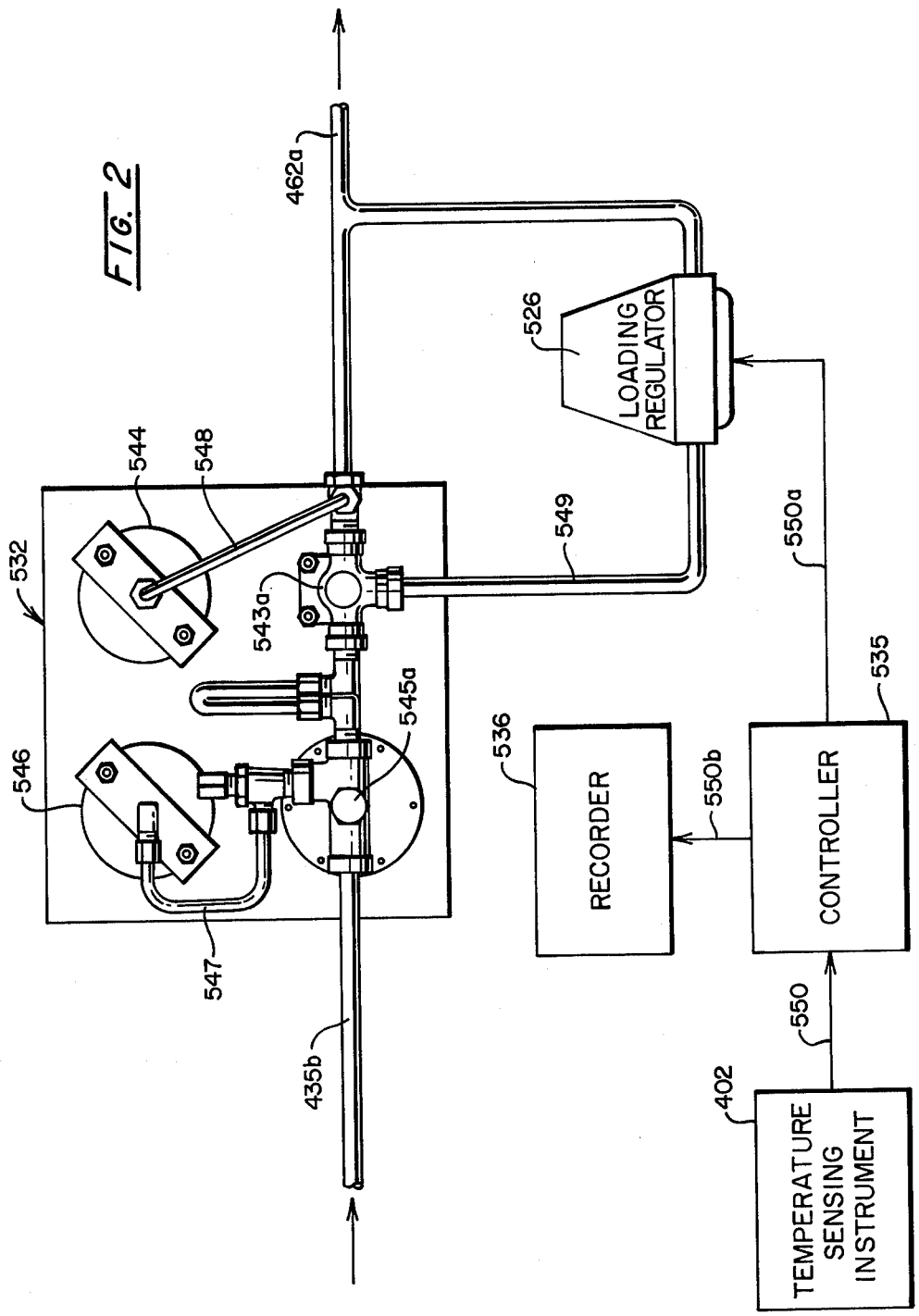
FIG. 2 is a combination piping and block diagram of that part of the temperature control system which controls one of the regulator valves that, in turn, controls the supply of cooling air to a particular part of each forming unit.

A circuit of this type is indicated in FIG. 2 for one of the loading regulators for controlling cooling of one of the parts of the pressing unit, in this case, the plunger 158. However, it will be understood that identical circuits will be provided for the regulators for cooling the sides and bottom of the blank mold. Thus, the loading regulator is indicated at 526. This regulator is an electro-pneumatic transducer and is electrically connected by cable 550a to a controller 535 which is connected to both a recorder 536 by cable 550b, and the temperature-sensing instrument 402, by cable 550, which is directed toward the path of the plungers 158. This transducer receives a direct-current input signal and uses a torque motor and pneumatic relay to convert the signal to a proportional pneumatic output signal. Each of the circuits of the type indicated in FIG. 2 for the respective loading regulators 526, 527 and 528 will include the respective sub-panels 537, 538 and 539, which indicate the actions of the controllers provided for the respective loading regulators 526, 527 and 528. Each controller will be of a type commercially available and will control its respective loading regulator in response to an integrated electrical signal produced by the connected temperature sensing instrument. These temperature-sensing instruments will preferably be cameras of the infra-red type which will sense in the range of 500° F to 2500° F. The controller converts the signal from the camera into millivoltage through the camera's range and supplies it to the electro-pneumatic transducer. The recorder 536 will be of a suitble commercially available type and will include the separate sections 540, 541 and 542 for indicating the temperature of the various forming members being controlled by temperatures sensed by the instruments or cameras 401, 402 and 402. Each of the sub-panels 532, 533 or 534, will carry a handle 543 for actuating a manual regulator valve and a meter 544 for indicating the resulting pressure. It will also carry a knob 545 for controlling the flow to the loading regulator and a meter 546 for indicating the pressure in the regulated outlet line when the control is automatic.

The back side of the sub panel 532 is indicated in FIG. 2 and it will be noted that the inlet line 435b leads into the valve 545a which is controlled by knob 545 and which is the manual control valve. This valve 545a is also connected to the gauge 546 by an actuating loop 547. When on automatic, the valve will be completely opened. The valve 545a connects with the valve 543a which is set for automatic or normal control by means of the handle 543. When on manual, it will connect valve 545a to the outlet line 462a. The outlet of valve 543a is connected by the branch line 548 to the gauge 543 which will indicate the pressure in the outlet line 462a at all times. A by-pass line 549 leads from valve 543a, through the regulator 526 and then to the outlet line 462a. When valve 543a is set on automatic, air will through the by-pass line 549 and regulator 526. At this time, valve 545a will also be open. When manual control only is desired, the valve 543a will be set to cut-off flow through the by-pass 549 and regulator 526. At this time, the flow can be controlled by the setting of the valve 545a.

The temperature-sensing unit 400, preferably an infra red camera as previously indicated, will be located at a position around the machine (FIG. 4) where the blank molds 95 will be exposed and free of glass and the plunger 158 will be raised out of the mold. At this time, the camera 401 will be carried at such a position by the arm 406, on pedestal 404, that it will be directed at the interior of the bottom of the blank mold 95. The camera 403 will be carried by one of the arms 407 so that it will be directed at the interior of the side of the mold 95 and the camera 402 will be carried on the arm 406 so that it will be directed at the top of the plunger 158, as indicated schematically in FIG. 1. The camera 402 is connected by a cable 550 to the controller 535, the camera 401 is connected by a cable 551 to the controller 536, and the camera 403 is connected by a cable 552 to the controller 537. Thus, as a blank mold 95 and plunger 158 of each pressing unit, is moved past the temperature-sensing unit 400, the temperatures thereof are sensed by the three camera 402, 401 and 403, to produce input signals which go to the respective controllers, like the controller 535, which control the respective regulators 526, 527 and 528 to control the amount of cooling air flowing to the plunger 158 and the blow mold 95. Each forming unit B is successively passed by the sensing unit 400 so that eventually, after start-up of the machine, they will all reach a uniform temperature and, therefore, produce uniform quality ware. At the startup, the manual valves 472 may be used to control the flow of cooling air but this is not necessary, as the automatic controls will so control the flow of cooling air that eventually all the pressing units will have the desired uniform temperature.

It will be apparent from the above description that according to this invention, there is provided an automatic temperature control system which, in the illustrated example, is applied to a continuous glass forming machine of the press-and-blow type, and which automatically senses the heat transfer conditions in the parison-forming or blank-forming units thereof and automatically controls the supply of cooling fluid, specifically air, thereto to maintain properly controlled conditions in the various units so tyat the final formed ware will be of uniform quality. Means is provided for circulating cooling air in the blank mold and plunger of each forming unit and the supply of air thereto is automatically controlled in accordance with heat transfer from these members. This control is accomplished automatically by temperature-sensing instruments located at precisely selected positions along the paths of movement on the machine of the blank mold and plunger of each forming unit, which produce a signal from each member that operates a controller which, in turn, operates a loading pressure regulator in the cooling air supply-line for that particular member. Thus, it will not be necessary to rely on the judgement of a machine operator to produce symetrically balanced temperature conditions but controlled temperature conditions can be maintained automatically during operation of the machine in order to produce uniform ware by preventing excessive heating or cooling of the pressed glass blanks.

In summary, this invention deals with that type of process and machine wherein a hot charge, such as glass, is used to form an article by a forming operation which may be part of a press and blow process. The forming is by cooperating implements, in the specific example a blank mold and plunger, which when forming the article from the charge of hot deformable material, absorb heat from the charge. According to this invention this absorbed heat is sensed at a preselected instant and the temperature of the forming implements is controlled by applying controlled amounts of cooling medium thereto. This medium is applied completely and symetrically around each implement and throughout its length resulting in precise control of the temperature in each forming member. The result is that articles formed by such process and machine will be of uniform quality. Furthermore, the temperature control is accomplished automatically without relying on the skill of a machine operator.

Having thus described the invention what is claimed is:

1. Apparatus for forming articles from charges of deformable hot material which includes an implement for forming successive charges of the hot material into shaped articles and thereby absorbing some of the heat from the charges, means for subjecting the implement to temperature-controlling fluid, and means for automatically controlling the supply of that fluid by temperature-sensing means directed at said implement subsequent to each forming operation so that it will be at the proper controlled temperature for forming the successive charges; said means for subjecting the implement to temperature-controlling fluid supplying it continuously, and said means for automatically controlling the supply of that fluid varying it in accordance with the temperature of the implement sensed by said temperature-sensing means; said means for subjecting the implement to temperature-controlling fluid including fluid passages in said implement; said forming implement including a mold for receiving the charge and a plunger for pressing the charge in the mold, said passages being formed in said mold and in said plunger; said means for automatically controlling the supply of temperature-controlling fluid comprising independent means for controlling the supply to the passages of the mold and the plunger including independent temperature-sensing means directed at the mold and the plunger; said mold and cooperating plunger producing a pressed blank; said apparatus including blow molds for receiving the successive blanks, said temperature-controlling means causing the successively formed blanks to be at a proper controlled temperature for blowing; a rotatable turret which carries a plurality of forming units each of which includes one of said blank molds and a cooperating plunger for pressing a blank and a blow mold for subsequently blowing the blank into final shape, said temperature-sensing means being located around the turret to sense the blank mold after the article is formed therein and the plunger after it has been withdrawn from the blank mold in which it pressed the blank; a fluid supply unit mounted in cooperative relationship with said turret, said independent means for controlling the supply of fluid to the passages of the mold and plunger including a separate supply line connected to each, said fluid supply unit comprising manifolds which rotate with said turret and are connected to each of said supply lines, and a source of supply connected to said manifolds to permit relative rotation thereof.

2. Apparatus according to claim 1 in which said manifolds comprise outer rings on the turret connected to the respective supply lines, inner rings on the turret connected with the respective outer rings, and said source of supply comprises distributor rings mounted in a fixed nonrotative position at the axis of said turret but in communication with said inner rings.

3. Apparatus according to claim 2 in which said manifold rings are arranged in a concentric stack about the turret axis, for rotation with the turret, and said distributor rings are arranged as a stack within the inner manifold rings so that they can rotate relatively, and sealing means between the relatively rotatable rings.

4. Apparatus according to claim 3 in which each of said distributor rings has an inwardly extending coupling lug for receiving a fluid source line, said lugs being angularly offset relatively to provide for vertical passage of the various source lines without interference.

5. Apparatus according to claim 4 in which said turret rotates about a fixed standard at its axis, a bearing support fixed to said standard, means for mounting the stacked distributor rings on said support a bearing between said support and the stack of inner manifold rings to permit relative rotation, and vertical supports supporting the outer manifold rings on said turret.

6. Apparatus according to claim 1 in which air supply lines are provided for blowing the articles in the blow molds and having loading regulators therein, one of said outer manifold rings of the stack being connected to said lines.

7. Apparatus according to claim 6 in which water supply lines are provided for supplying water to the blow mold and have loading regulators therein, one of said outer manifold rings of the stack being connected to said lines.

8. Apparatus according to claim 5 in which a lubricant-distribution ring is mounted at the bottom of the distributor ring stack on said bearing support.

9. Apparatus according to claim 1 in which each of said supply lines has a loading regulator therein as a part of said means for controlling the supply of fluid and which is controlled by said temperature-sensing means.

10. Apparatus for forming articles from charges of deformable hot material comprising a forming unit including cooperating implements for forming successive charges of the hot material into shaped articles and thereby absorbing some of the heat from the charges, means for subjecting the forming unit to temperature controlling fluid, and means for automatically controlling the supply of that fluid by temperature-sensing means directed at said forming unit subsequent to each forming operation so that it will be at the proper controlled temperature for forming the successive charges; said means for subjecting the forming unit to temperature-controlling fluid supplying it continuously; and said means for automatically controlling the supply of that fluid varying it in accordance with temperature of the unit sensed by said temperature-sensing means; said means for subjecting the forming unit to temperature-controlling fluid including a plurality of independent fluid passages for said unit; said means for automatically controlling the supply of temperature-controlling fluid comprising independent means for controlling the supply to the passages; a rotatable turret which carries a plurality of said forming units; said temperature-sensing means being located around the turret to sense the forming unit temperature after the article is formed therein; a fluid supply unit mounted in cooperative relationship with said turret, said independent means for controlling the supply of fluid to the passages of the forming unit including separate supply lines connected thereto, said fluid supply unit comprising manifolds which rotate with said turret and are connected to each of said supply lines, and a source of supply connected to said manifolds to permit relative rotation thereof.

11. Apparatus according to claim 10 in which said manifolds comprise outer rings on the turret connected to the respective supply lines, inner rings on the turret connected with the respective outer rings, and said source of supply comprises distributor rings mounted in a fixed non-rotative position at the axis of said turret but in communication with said inner rings.

12. Apparatus according to claim 11 in which said manifold rings are arranged in a concentric stack about the turret axis, for rotation with the turret, and said distributor rings are arranged as a stack within the inner manifold rings so that they can rotate relatively, and sealing means between the relatively rotatable rings.

13. Apparatus according to claim 12 in which each of said distributor rings has an inwardly extending couple lug for receiving a fluid source line, said lugs being angularly offset relatively to provide for vertical passage of the various source lines without interference.

14. Apparatus according to claim 13 in which said turret rotates about a fixed standard at its axis, a bearing support fixed to said standard, means for mounting the stacked distributor rings on said support, a bearing between said support and the stack of inner manifold rings to permit relative rotation, and vertical supports supporting the outer manifold rings on said turret.

15. Apparatus according to claim 10 in which each of said supply lines has a loading regulator therein as a part of said means for controlling the supply of fluid and which is controlled by said temperature-sensing means.

16. Apparatus for forming articles of deformable hot material comprising a continuously moved support for supporting a plurality of successively spaced forming units so that they will receive and form the charges during the continuous movement of the support and each of which includes an implement for engaging and forming successive charges of the hot material and thereby absorbing some of the heat by heat transfer from the charges, means for subjecting the implement continuously to temperature-controlling fluid, said means including a passage for the fluid cooperating with the implement to contact it continuously with the fluid and an adjustable loading regulator supported independently of said continuously moved support for continuously controlling the rate of flow of fluid through said passage, a source of supply of fluid to the passages through the regulators of the respective implements which is fixed relative to the continuously moved support but is connected to said passages continuously by means permitting the continuous movement of said support and the forming units carried thereby; temperature-sensing means located along the path of continuous movement of said forming units on said continuously moved support and supported in a fixed position relative to the movement thereof so as to be directed at the implement of each unit after each forming operation to determine the heat transfer condition and resulting temperature thereof after each forming operation and to provide an electrical signal indicating the actual temperature of the implement; a controller supported independently of said continuously moved support and electrically connected to said temperature-sensing means for receiving the temperature-indicating electrical signal therefrom as an input signal and providing an output signal determined thereby to said loading regulator for that implement to which it is electrically connected for controlling said loading regulator continuously so that it controls the rate of fluid flowing continuously through its passage into contact with said implement for controlling its heat transfer and resulting temperature, in accordance with the temperature of the implement sensed by said temperature-sensing means as that implement passes by said temperature-sensing means.

17. Apparatus according to claim 16 in which each of said forming units includes a forming mold member for receiving the hot charge and a forming plunger member for pressing the charge in the mold member with passages for the temperature-controlling fluid for both said mold member and said plunger member and with one of said loading regulators independently continuously controlling the fluid passages of the respective forming members, and one of said fixed position temperature-sensing means is independently directed at each of the forming members and connected to the controller to control the loading regulator for the respective forming member in accordance with the temperature of that forming member sensed by it.

18. Apparatus according to claim 17 in which said passages for the temperature-controlling fluid extend substantially around the periphery and throughout the axial extent of said mold and said plunger.

19. Apparatus according to claim 17 in which the mold and cooperating plunger produce a pressed blank, said forming units including blow molds for receiving the successive blanks, said temperature-controlling fluid causing the successively-formed blanks to be at a proper controlled temperature for blowing.

20. Apparatus according to claim 19 in which each of the fixed-position temperature-sensing means comprises an infra-red camera, one of which is directed at blank mold after formation of the blank therein and removal therefrom and another of which is directed at the plunger after it completes the pressing operation in the mold and is withdrawn therefrom.

21. Apparatus according to claim 20 in which the temperature-controlling fluid is air and the adjustable loading regulator is an electro-pneumatic transducer which is electrically connected to said controller and pneumatically connected to the air passage which it controls.

22. Apparatus according to claim 21 in which the controller is also electrically connected to an electrically-actuated continuous recorder.

23. Apparatus according to claim 20 in which the temperature-controlling fluid is air and a cooling air supply line is connected to each of the passages controlled by the loading regulator, and each cooling air supply line includes an adjustable manually operable valve which can be set for different air supplies and which is located between the loading regulator and the mold or plunger passage which it controls.

24. Apparatus according to claim 21 in which each cooling air line is connected to an air control circuit including a pressure gauge for indicating inlet pressure to the regulator, a pressure gauge for indicating outlet pressure from the regulator, a manually actuated valve for selectively disconnecting the regulator from the line, and a manual valve which is thereby connected to and thereafter controls the line.

25. Apparatus according to claim 20 in which the mold comprises a cavity member and a holder, said temperature-controlling fluid being air and passages therefor being formed in the side walls of the cavity member and between the bottom of it and the holder, said means for controlling the supply of cooling air comprising independent supply lines connected to each passage and each line having a loading regulator therein, and said infra-red cameras include one directed at the interior of the side of the mold and one directed at the interior of the bottom of the mold and control the respective loading regulators in the cooling air supply lines for the respective side walls and bottom passages of the mold.

26. Apparatus according to claim 25 in which the temperature-controlling fluid passages for the plunger are formed by means of a tube extending substantially the full length thereof and connected to an air supply line at its upper end which has a loading regulator therein, means for centering the tube within the plunger to provide an annular chamber therein which has outlets at its upper end, said tube having a nozzle portion at its lower end with discharge outlets, and said infra-red cameras include one which is directed on the exterior of said plunger and controls the regulator for the cooling air supply line thereof.

27. Apparatus according to claim 20 in which said continuously moved support supports a plurality of successively-spaced forming units each of which includes one of said blank molds and a cooperating plunger mounted thereon for cooperation for pressing a blank along with a blow mold for subsequently blowing the blank into final shape, all during the continuous movement of the support; said infra-red cameras being at selected relatively fixed locations along the path of continuous movement of said forming units on said support to sense the heat transfer of the blank mold during its continuous movement after the article is formed therein and to sense the heat transfer of the plunger during its continuous movement after it has been withdrawn from the blank mold in which it pressed the blank.

28. Apparatus according to claim 27 in which the support is a rotatable turret that is rotated continuously about a central axis, said turret carrying a plurality of said forming units at angularly spaced positions about said axis, said infra-red cameras being supported at fixed angularly-spaced locations around the periphery of said turret and independently thereof.

* * * * *